Oct. 2, 1928.                                                                 1,685,936
                              J. M. BROWN
                         FIELD DISCHARGE SWITCH
                          Filed Jan. 23, 1920
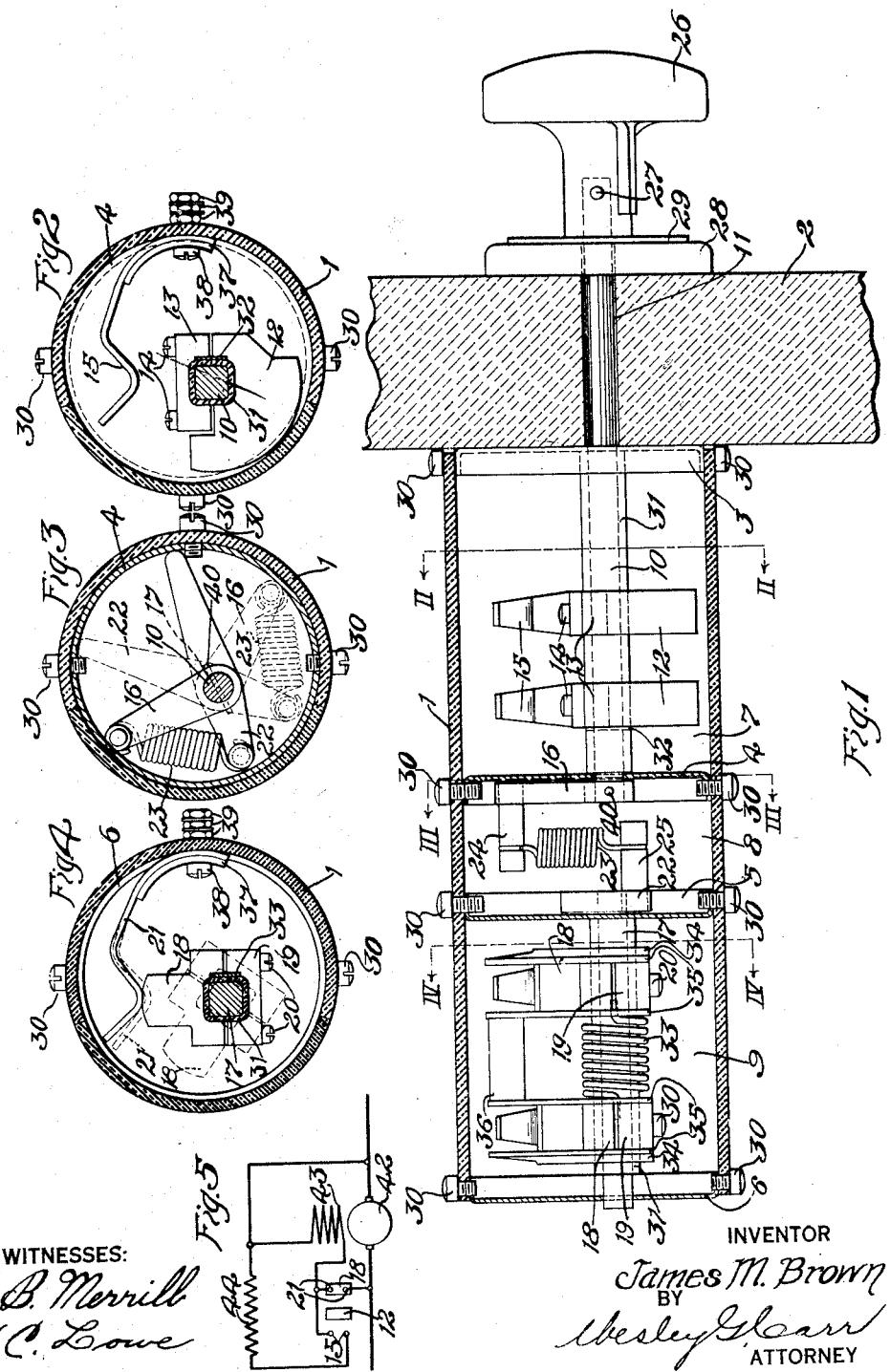
WITNESSES:                                                    INVENTOR
J. B. Merrill                                                James M. Brown
H. C. Lowe                                                BY
                                                           Wesley G. Carr
                                                                ATTORNEY Patented Oct. 2, 1928.

1,685,936

UNITED STATES PATENT OFFICE.

JAMES M. BROWN, OF PITTSBURGH, PENNSYLVANIA, ASSIGNOR TO WESTINGHOUSE ELECTRIC AND MANUFACTURING COMPANY, A CORPORATION OF PENNSYLVANIA.

FIELD DISCHARGE SWITCH.

Application filed January 23, 1920. Serial No. 353,405.

My invention relates to switches and particularly to switches employed in protecting the field-magnet windings of dynamo-electric machines or other circuits having relatively high inductance.

One object of my invention is to provide a switch that shall have means whereby one circuit may be completed before a second circuit is quickly interrupted.

Another object of my invention is to provide a switch, of the above indicated character, that shall be compact in structure, durable in service and economical to manufacture.

The introduction of a second circuit before breaking the first may be desirable for a number of purposes; for example, so inserting a high-resistance resistor in the field-magnet windings of a dynamo-electric machine that the current induced in the field windings, when the field-magnet winding circuit is broken, is largely expended in the resistor. This function may also be used to introduced a secondary lighting system, when the main lighting system is de-energized; or to introduce a dynamo-electric machine before de-energizing one which is in operation.

In view of the above, I provide a single operating handle, switch members and means connected therebetween to effect the relatively quick operation of one of the switch members after the closure of the other switch member.

For a better understanding of my invention, reference may be made to the accompanying drawings, of which Figure 1 is a view, partially in elevation and partially in section, of a switch embodying my invention; Figs. 2, 3, and 4 are sectional views of the same, taken along the lines II—II, III—III and IV—IV, respectively, of Fig. 1, and Fig. 5 is a diagrammatic view, showing the location of my switching device in circuits which include the field-magnet winding of a dynamo-electric machine.

Referring particularly to Fig. 1, a cylindrical casing 1 of non-conducting material is mounted upon a slab or panel 2 of slate or other suitable material and is divided, by discs 3, 4, 5, and 6, into three compartments 7, 8, and 9. A shaft 10 is mounted in an opening 11 in the slab 2 and is journaled in the discs 3 and 4. Contact members 12 of arcuate shape are attached to the shaft 10 by a clamping member 13 and screws 14 and may engage resilient contact fingers 15 when the shaft 10 is turned. A crank arm 16 is secured to the inner end of the shaft 10 that extends into the compartment 8.

A shaft 17 is mounted in the compartment 9 and is journaled in the discs 5 and 6. Contact members 18 are attached to the shaft 17 by a clamping member 19 and screws 20 and they may engage resilient contact fingers 21 when the shaft 17 is turned. A crank arm 22 is secured to the end of the shaft 17 that extends into the compartment 8.

One end of a spring 23 is attached to a projection 24 of the arm 16 and the other end of the spring is attached to a projection 25 of the arm 22.

An operating handle 26 is secured to the outer end of the shaft 10 by a screw 27. A dial plate 28 and a name plate 29 are mounted on the slab 2 between it and the handle 26. The discs 3, 4, 5, and 6 are secured to the casing 1 by screws 30.

The contact members 12 and 18 are insulated from the shafts 10 and 17 by tubes 31 of micarta or other suitable insulating material. The contact members 12 are electrically connected to each other by a conducting strip 32.

The contact members 18 are electrically connected through a blow out coil 33. Magnetizable plates 34 are secured to the shaft 17 and are insulated therefrom by the tube 31. Plates 35 of suitable non-conducting material are mounted on the shaft 17 and serve to insulate the contact members 18 from the plates 34 and a magnetizable bar 36, that is positioned between the two central plates 35.

Referring particularly to Fig. 2, the contact member 12 is shown rigidly mounted upon the shaft 10 by means of the clamping member 13 and the screws 14 and insulated therefrom by the tube 31. The resilient contact fingers 15 are stiffened by braces 37 of arcuate shape and are secured to the casing 1 by the screws 38 and nuts 39, which also constitute binding posts.

Referring particularly to Fig. 3, the shafts 10 and 17 are substantially in alignment. The arm 16 is secured to the shaft 10 by the pin 40 and is limited, in its turning movement, by the rim of disc 4, as shown in Fig. 3. The arm 22 is limited in its turning movement by the rim of disc 5. As the arm 16 is turned from its position shown by solid lines to its position shown by broken lines, the spring 23 is first elongated, and as it passes beyond the center line of the arm 22, it snaps the arm 22 to its position shown by the broken lines.

Fig. 4 shows one of the contact members 18 and one of the fingers 21. Their shape is such as to insure a good contact when they are engaged and a quick break when the switch is opened. The position of the contact members and the contact fingers, when the circuit is open, is shown by broken lines.

Referring particularly to Fig. 5, the contact members 18 and the contact fingers 21 are shown in a circuit which includes a dynamo-electric machine 42 and its field-magnet winding 43. The contact members 12 and the contact fingers 15 are shown in a secondary circuit which includes the field winding 43 and a resistor 44.

The switching device, as shown in Fig. 1 and Fig. 2, and by the solid lines in Fig. 3 and Fig. 4, has the circuit that is connected to the contact fingers 15 open and that connected to the contact fingers 21 closed. If the handle 26 be turned clockwise, the contact members 12 are turned clock-wise until they engage the contact fingers 15, and the arm 16 is turned until it is stopped by the rim of the disc 4.

After a good contact has been made between the contact members 12 and the contact fingers 15, the spring 23, which has been elongated, jerks the arm 22 around into the position that is shown by broken lines in Fig. 3. The rapid movement of the arm 22 actuates the shaft 17 and quickly breaks the engagement between the contact members 18 and the contact fingers 21. This disengagement occurs with great speed.

By turning the handle counter-clockwise, so that the contact members 12 become disengaged from the contact fingers 15, the arm 16 is turned counter-clockwise from the position shown by broken lines in Fig. 3 to its first position shown by solid lines. The reverse movement of the arm 16 elongates the spring 23, which rapidly returns the arm 22 to its original position shown in Fig. 3, when the arm 16 turns beyond the longitudinal axis of the arm 22, which is shown by broken lines.

The reverse movement of the arm 22 rapidly turns the contact member 17 from its position shown by broken lines in Fig. 4, to its first position shown by solid lines, thereby engaging the contact fingers 21.

The blow-out coil 33, the magnetizable plates 34, the magnetizable bar 36, and insulating plates 35 serve to prevent arcing between the contact members 18 and the contact fingers 21, when the switch is being opened or closed.

From the description of my invention, it is apparent that it provides a ready means of closing one circuit before opening another circuit and that the one circuit is opened and closed with great rapidity.

While I have shown my invention in a preferred form, it may be subjected to slight modifications, therefore, I desire to be limited only by the scope of the appended claim.

I claim as my invention:

In an electric switching device, the combination with a holding member provided with two end compartments and one central compartment, of a switch member rotatably mounted in one of the said end compartments, a means external to the said holding member for operating the said switch member, an arm rotatably mounted in the central compartment and coacting with the said switch member, a second switch member rotatably mounted in the opposite end compartment, a second arm rotatably mounted in the said central compartment and coacting with the said second switch member, and a resilient means attached to the said arms for ensuring coaction thereof.

In testimony whereof, I have hereunto subscribed my name this 9th day of January, 1920.

JAMES M. BROWN